US010042735B2

(12) United States Patent
Nandakumar et al.

(10) Patent No.: US 10,042,735 B2
(45) Date of Patent: Aug. 7, 2018

(54) SELECTING APPLICATION WRAPPER LOGIC COMPONENTS FOR WRAPPING A MOBILE APPLICATION BASED ON WRAPPER PERFORMANCE FEEDBACK FROM USER ELECTRONIC DEVICES

(71) Applicant: CA, INC., New York, NY (US)

(72) Inventors: Vikrant Nandakumar, Karnataka (IN); Naveen Harry Michael, Karnataka (IN); Hemanth Kumar Pinninti, Andhra Pradesh (IN)

(73) Assignee: CA, INC., New York, NY (US)

( * ) Notice: Subject to any disclaimer, the term of this patent is extended or adjusted under 35 U.S.C. 154(b) by 265 days.

(21) Appl. No.: 14/796,707

(22) Filed: Jul. 10, 2015

(65) Prior Publication Data

US 2017/0010952 A1   Jan. 12, 2017

(51) Int. Cl.
*G06F 9/44* (2018.01)
*G06F 11/36* (2006.01)
*G06F 8/30* (2018.01)
*G06F 8/53* (2018.01)
*G06F 9/455* (2018.01)

(52) U.S. Cl.
CPC ............ *G06F 11/3612* (2013.01); *G06F 8/30* (2013.01); *G06F 8/53* (2013.01); *G06F 9/45504* (2013.01)

(58) Field of Classification Search
CPC .......... G06F 11/3612; G06F 8/30; G06F 8/53; G06F 9/45504
USPC ......................................................... 717/120
See application file for complete search history.

(56) References Cited

U.S. PATENT DOCUMENTS

| 7,818,721 | B2 * | 10/2010 | Sundararajan | G06F 11/3644 717/130 |
| 8,769,346 | B2 * | 7/2014 | Sijelmassi | G06F 11/0709 714/47.1 |
| 8,813,079 | B1 * | 8/2014 | Lindo | G06F 9/526 718/100 |
| 8,893,087 | B2 * | 11/2014 | Maddela | G06F 8/70 714/745 |
| 2003/0182654 | A1 * | 9/2003 | Dmitriev | G06F 11/3466 717/151 |
| 2005/0071815 | A1 * | 3/2005 | Mitchell | G06F 11/3644 717/127 |
| 2006/0259976 | A1 * | 11/2006 | Thompson | G06F 21/125 726/26 |
| 2007/0074170 | A1 * | 3/2007 | Rossmann | G06F 11/3466 717/127 |

(Continued)

*Primary Examiner* — Lewis A Bullock, Jr.
*Assistant Examiner* — Theodore Hebert
(74) *Attorney, Agent, or Firm* — Sage Patent Group

(57) ABSTRACT

For each of a plurality of wrapper logic components, a metric is determined from content of reports received from user electronic devices that characterizes performance of the wrapper logic component when executed by the user electronic devices to monitor a feature of an application during execution of the application by the user electronic devices. A set of the wrapper logic components is selected that excludes from the set any of the wrapper logic components having performance characterized by the metrics that does not satisfy a first defined rule. The set of wrapper logic components and the application are combined to form a modified application with the wrapper logic components of the set configured to monitor features of the modified application when executed by user electronic devices.

20 Claims, 8 Drawing Sheets

(56) References Cited

U.S. PATENT DOCUMENTS

| | | | |
|---|---|---|---|
| 2007/0168998 A1* | 7/2007 | Mehta | G06F 11/3676 717/130 |
| 2007/0180439 A1* | 8/2007 | Sundararajan | G06F 11/3644 717/158 |
| 2007/0199000 A1* | 8/2007 | Shekhel | G06F 21/53 719/330 |
| 2009/0199161 A1* | 8/2009 | Cutler | G06F 11/366 717/124 |
| 2010/0017789 A1* | 1/2010 | DeWitt, Jr. | G06F 11/3466 717/126 |
| 2011/0283263 A1* | 11/2011 | Gagliardi | G06F 11/3644 717/130 |
| 2011/0283264 A1* | 11/2011 | Gagliardi | G06F 11/3644 717/130 |
| 2013/0145108 A1* | 6/2013 | Lindo | G06F 11/0778 711/162 |
| 2014/0089901 A1* | 3/2014 | Hadar | G06F 17/3089 717/127 |
| 2014/0149575 A1* | 5/2014 | Blackwell | H04L 43/04 709/224 |
| 2016/0224322 A1* | 8/2016 | Srinivasaiah | G06F 8/315 |
| 2016/0378447 A1* | 12/2016 | Nandakumar | G06F 8/53 717/108 |
| 2017/0010952 A1* | 1/2017 | Nandakumar | G06F 11/3612 |

\* cited by examiner

SELECTING APPLICATION WRAPPER LOGIC COMPONENTS FOR WRAPPING A MOBILE APPLICATION BASED ON WRAPPER PERFORMANCE FEEDBACK FROM USER ELECTRONIC DEVICES

FIELD

The inventive concepts described herein relate to operational applications for mobile computing devices. In particular, the inventive concepts relate to wrapping of software applications with application wrappers that monitor, test and/or manage the applications.

BACKGROUND

Applications developed for mobile devices are distributed in an application package containing the elements needed to run the application, such as the program code, resources, certificates and a manifest.

In some cases, it is desirable for an entity such as an application designer, application owner, or enterprise administrator to exercise control over the operation of an application. For example, it may be desirable to exercise control over what features or elements of a device or operating system that the application can access, what time of day those features or elements can be accessed, what security policies are applied to the application, etc.

To accomplish this, the program code of the application may be modified to include code that performs or links to monitoring and control functions. This modification is referred to as "application wrapping." When an application is wrapped, a layer of code is added to the application binary file to add features or modify behavior of the application without making functional changes to the internal application code. The addition of wrapping code may reduce the risk to an enterprise of improper or unauthorized use of an application. For example, wrapping can add security and management features to an application before it is deployed to the enterprise. Moreover, wrapping can enable tracking of application feature usage and reporting of related metrics and problems. However, the wrapping can negatively affect performance of the application due to overhead associated with execution of the wrapper code, and the wrapped application requires more storage memory than the non-wrapped application.

SUMMARY

Some embodiments of the present disclosure are directed to a method of performing operations on a processor of an application wrapper computer. For each of a plurality of wrapper logic components, the method determines a metric from content of reports received from user electronic devices that characterizes performance of the wrapper logic component when executed by the user electronic devices to monitor a feature of an application during execution of the application by the user electronic devices. A set of the wrapper logic components is selected that excludes from the set any of the wrapper logic components having performance characterized by the metrics that does not satisfy a first defined rule. The set of wrapper logic components and the application are combined to form a modified application with the wrapper logic components of the set configured to monitor features of the modified application when executed by user electronic devices.

Some other embodiments of the present disclosure are directed to a computing device that includes a processor in a memory coupled to the processor and storing computer readable program code that when executed by the processor causes the processor to perform operations. The operations include, for each of a plurality of wrapper logic components, determining a metric from content of reports received from user electronic devices that characterizes performance of the wrapper logic component when executed by the user electronic devices to monitor a feature of an application during execution of the application by the user electronic devices. The operations further include selecting a set of the wrapper logic components that excludes from the set any of the wrapper logic components having performance characterized by the metrics that does not satisfy a first defined rule, and combining the set of wrapper logic components and the application to form a modified application with the wrapper logic components of the set configured to monitor features of the modified application when executed by user electronic devices.

Other methods, computing devices, and computer program products according to embodiments of the present disclosure will be or become apparent to one with skill in the art upon review of the following drawings and detailed description. It is intended that all such methods, computing devices, and computer program products be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION OF EMBODIMENTS

Figure 1:
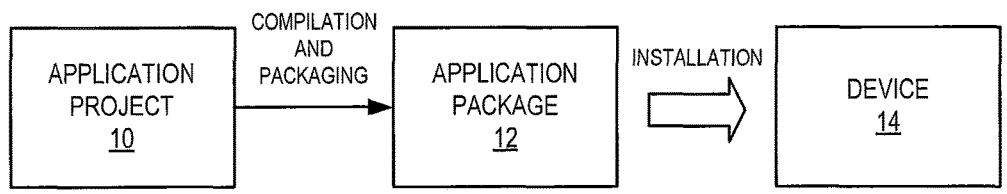
FIG. 1 is a block diagram illustrating the packaging and installation of an application on a user electronic device.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to reducing the overhead caused to user electronic devices which host wrapped applications. Wrapper logic components added to a wrapped application package increase the memory storage requirements for a user electronic device. Moreover, execution of the wrapper logic components by the user electronic device can have undesirable effects that can include one or more of: increasing run-time memory requirements; increasing processor throughput requirements; increasing network communication bandwidth; decreasing responsiveness of application features to system events; decreasing responsiveness of the operating system to API calls from application features; and introducing run-time errors to the application.

As will be explained below, a set of wrapper logic components is selected during the building of the wrapped application package based on analysis of particular features that are contained in an application. However, this approach results in an initial snapshot features that may not accurately or optimally represent which particular features are executed when the application is deployed to user electronic devices, and may not account for how frequently or infrequently such features are executed. For example, analysis of permissions requested by the application may imply use of features that are not contained in the application. Tracing operational flows through the application may identify features that are contained in unreachable and/or stale code which is not called during runtime execution on user electronic devices.

The initial snapshot of features contained in the application may not accurately represent which features are performed on potentially a myriad of different types of hardware and software platform configurations provided by user electronic devices. For example, some application features may operationally require resources (e.g., ultra high-definition camera, barometric pressure altimeter, etc.) that are not present on many user electronic device platforms. Thus, the initial determination of features contained in application may not accurately represent which features will be executed when deployed, e.g., due to unavailability of feature required resources and/or lack of users selection of the feature. Moreover, the initial determination of features does not account for how frequently or infrequently such features are executed when deployed.

Various embodiments of the present disclosure can decrease overhead due to wrapping based on using run-time feedback from user electronic devices of metrics characterizing performance of the wrapper logic components during execution by the user electronic devices. In some operational environments, the metrics can be generated from content of reports received from thousands or hundreds of thousands of user electronic devices. Performance metrics can be separately determined for different ones of the wrapper logic components based on feedback from a wide range of hardware and software platform configurations provided by user electronic devices. The performance metrics may be separately determined for each different one of the configurations, or may be combined based on reports from various different configurations of the user electronic devices.

A set of wrapper logic components which is to be included in a wrapped application package, is selected to exclude any of the wrapper logic components having performance characterized by the metrics that does not satisfy a defined rule. As will be explained in further detail below, the rule may cause a wrapper logic component to be excluded from the set based on the reported metrics indicating: the wrapper logic component monitors a feature that is not executed; the wrapper logic component monitors a feature that is executed less than a threshold number of times; the wrapper logic component monitors a feature that is executed more than a threshold number of times; the wrapper logic component consumes more than a threshold amount of processor utilization; the wrapper logic component consumes more than a threshold amount of memory; the wrapper logic component consumes more than a threshold amount of network communication utilization; the wrapper logic component causes more than a threshold amount of additional latency to responsiveness of the application to system events; the wrapper logic component causes more than a threshold amount of additional latency to responsiveness of the operating system to API calls from the application; and/or an error occurs during operation of a feature monitored by the wrapper logic component.

Accordingly, a wrapped application package can be initially deployed using a feature-centric set of wrapper logic components determine based on certain initial determinations about what features will be used during execution of the application by user electronic devices. Another updated wrapped application package can then be subsequently generated using a sub-set of the wrapper logic components which is selected based on run-time feedback reports received from user electronic devices that have been executing the application while tracking and reporting performance of the wrapper logic components. The subsequently generated wrapped application package may have less memory storage requirements and/or improved performance overhead characteristics.

FIG. 1 shows an example development flow for an application developed using the Android operating system and distributed in a package file, such as an Android Package File. An application project 10 includes various files needed to build an application, including source code, libraries, resources, and certificates. The source code is compiled into binary executable code that is packaged along with the associated resources and manifest into an application package 12.

An application is typically written in a high level programming language, such as Java. During compilation and packaging, the source code may be first compiled into a binary format and then converted into a format appropriate for the operating system on which the application is to be used. For example, for a Java application running on an Android platform, the source code is first compiled into class files in the Java bytecode format, which are then converted into ".dex" files in the Dalvik bytecode. The Dalvik bytecode is the native format of the Android operating system.

The application package 12, such as an Android Package in the ".apk" format, is then generated including the binary program code in ".dex" files, along with associated resources and a manifest file. During installation onto a device 14, the operating system of the device 14 reads the manifest file and unpacks and installs the program code and associated resources from the .apk file on the device 14. The device 14 may be an end-user device such as a smart phone, tablet computer, laptop computer, desktop computer, appliance terminal (e.g., thermostat), etc.

Figure 2:
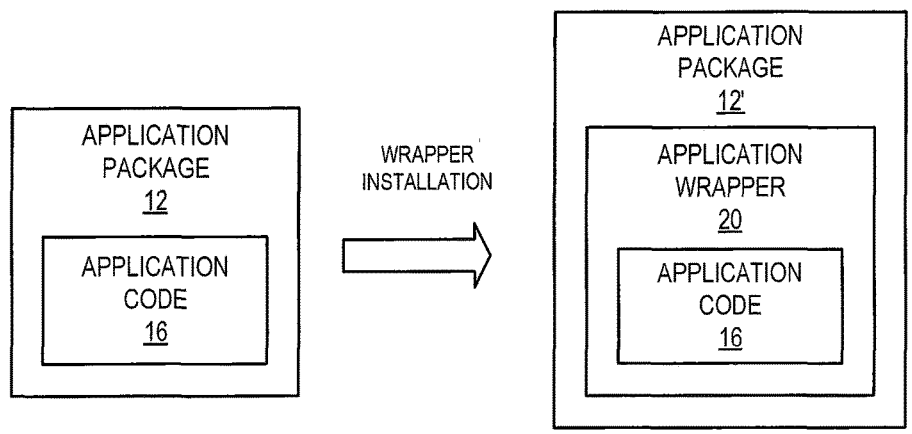
FIG. 2 is a block diagram illustrating installation of an application wrapper that encapsulates application code.

Installation of an application wrapper is illustrated in FIG. 2. As shown therein, before wrapping, an application package 12 includes application code 16. The modified application package 12' is generated that in includes the application wrapper 20 installed "around" to encapsulate the application code 16. The application code 16 is typically modified to include hooks (program code) that facilitate integration with the application wrapper 20. When the application package 12' is installed on a device, the operating system installs the application code 16 wrapped by the application wrapper 20 onto the device.

Figure 3:
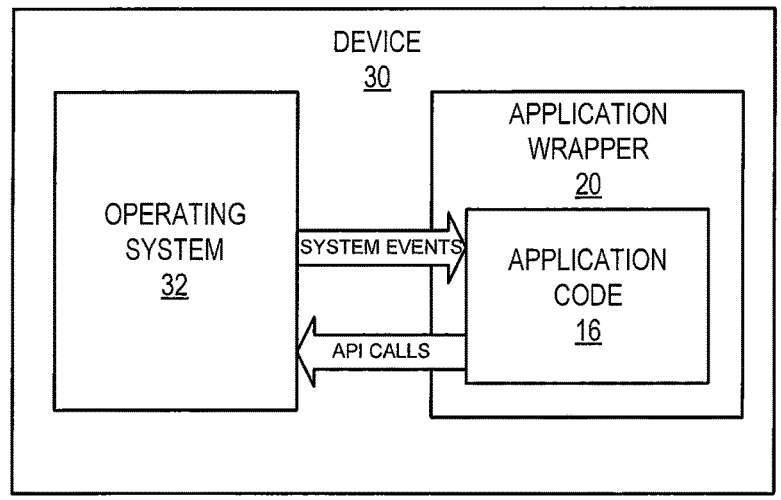
FIGS. 3 and 4 are block diagrams illustrating operation of an application wrapper encapsulating application code.

FIG. 3 illustrates operation of the application wrapper 20 encapsulating the application code 16 on a device 30 which includes an operating system 32. The operating system 32 notifies the application code 16 of system events associated with the application. A system event is an action of the system that must be handled by the application code 16, such as "launch app", "OnStart", "OnStop", etc. For example, the operating system 32 may generate a "launch app" event in response to a user tapping on an app in the user interface of the device 30. System events are processed by a responsive function in the application code 16. When an application wrapper 20 is installed, however, the application wrapper 20 may monitor (e.g., intercept) system events and determine if an action should be taken in response to the system event. For example, the application wrapper 20 may record the system event, generate a notification in response to the system event, etc.

The logic of the application wrapper 20 may also determine whether or not the system event should be passed along to the application code 16. Accordingly, the application wrapper 20 may implement logic that monitors for system events provided to the application code 16. Note that the responsive function of the application code 16 may be left in place to processes system events that are passed through to the application code 16 by the application wrapper 20.

For example, the operating system 32 may generate an "onResume" event which is intercepted by the application wrapper 20. If the logic in the application wrapper 20 determines that the application 16 is not authorized to resume, then the application wrapper 20 blocks the event by not forwarding it to the responsive function in the application code 16.

The application wrapper 20 may also monitor (e.g., intercept) application programming interface (API) calls made by the application code 16 to the operating system 32. The application code 16 issues an API call to request services from the operating system 32. For example, an API call may be used to turn on a camera, to read data from storage, to display an image on a screen, to pass data to another application (e.g., to an encryption application, communication application, etc.), or to invoke any other functionality provided by the operating system 32.

The application wrapper 20 may pass the API call along to the operating system 32. Before the API call is passed to the operating system 32, the logic of the application wrapper 20 determines if any action needs to be taken in response to the API call and may also determine whether or not to pass the API call along to the operating system 32.

In general, the application wrapper 20 includes executable code that monitors and/or controls behavior of the application code 16 by intercepting one or more API calls by the application code 16, executes monitoring and/or control code in response to the API call, and thereafter returns control to the application code 16 and/or passes the API call to the operating system 32 for processing.

For example, in case the application wrapper 20 is designed to limit access to a feature or resource on the device 30 during a designate time frame the application wrapper 20 may intercept an API call from the application code 16 that invokes the feature and, if the API call is made outside the designated time frame, generate and return an error code to the application code 16 instead of passing the API call on to the operating system 32.

Figure 4:
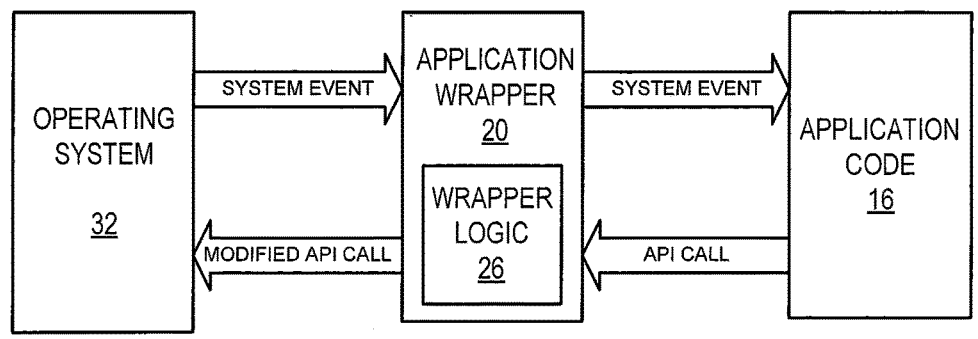

FIG. 4 illustrates the relationship between the operating system 32, the application wrapper 20 and the application code 16 in more detail. In particular, the application wrapper 20 includes wrapper logic 26 that determines how intercepted system events and API calls are processed by the application wrapper 20.

As shown in FIG. 4, the application wrapper 20 intervenes between the operating system 32 and the application code 16 and filters and/or operates on system events and API calls passing between the operating system 32 and the application code 16. When a system event is generated and sent to the application code 16 by the operating system 20, a monitoring function in the application wrapper 20 intercepts the system event and passes it to the wrapper logic 26. The wrapper logic 26 determines how to respond to the system event and whether or not to pass the system event along to the application code 16.

A monitoring function in the application wrapper 20 listens for API calls from the application code 16, and passes the API calls to the wrapper logic 26. The wrapper logic 26 determines how to respond to the API call, whether to modify the API call, and whether or not to pass the API call or the modified API call along to the operating system 32.

For example, assume that the application code 16 issues a system log API call to log an event that occurred during operation of the application code 16 to a system log. The wrapper logic 26 may determine that the event should be logged to a separate event log, and may modify the API call to log the event to the separate event log rather than to the system log.

It will be appreciated that many different types of wrapping/instrumentation tools are offered by various vendors. For example, application monitoring tools are available, such as Flurry, Calif. Mobile Application Analytics, Tealeaf and Cassandra. Testing tools, such as IBM Rational Test Workbench Mobile, MonkeyTalk, Jamo, SeeTest and Squish are also available, while management applications are also available, such as CA Mobile Application Management, AirWatch, MobileIron and Fibrelink. In some cases, it is desirable to apply two different wrapping applications to a single application program so that, for example, the application can be both monitored and managed simultaneously.

Figure 5:
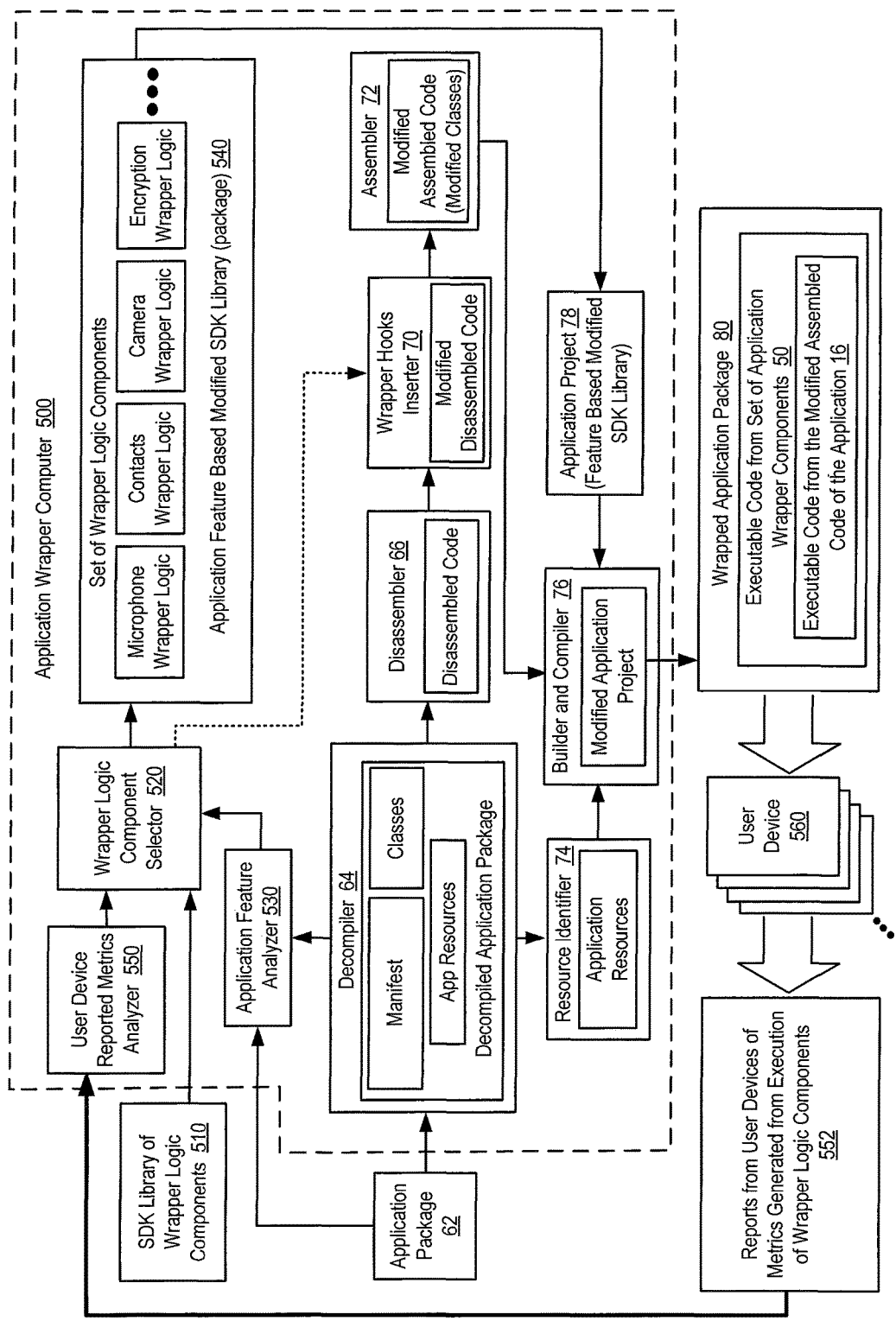
FIG. 5 is a block diagram illustrating operations and data flows of an application wrapper computer to generate a wrapped application package.
Figure 6:
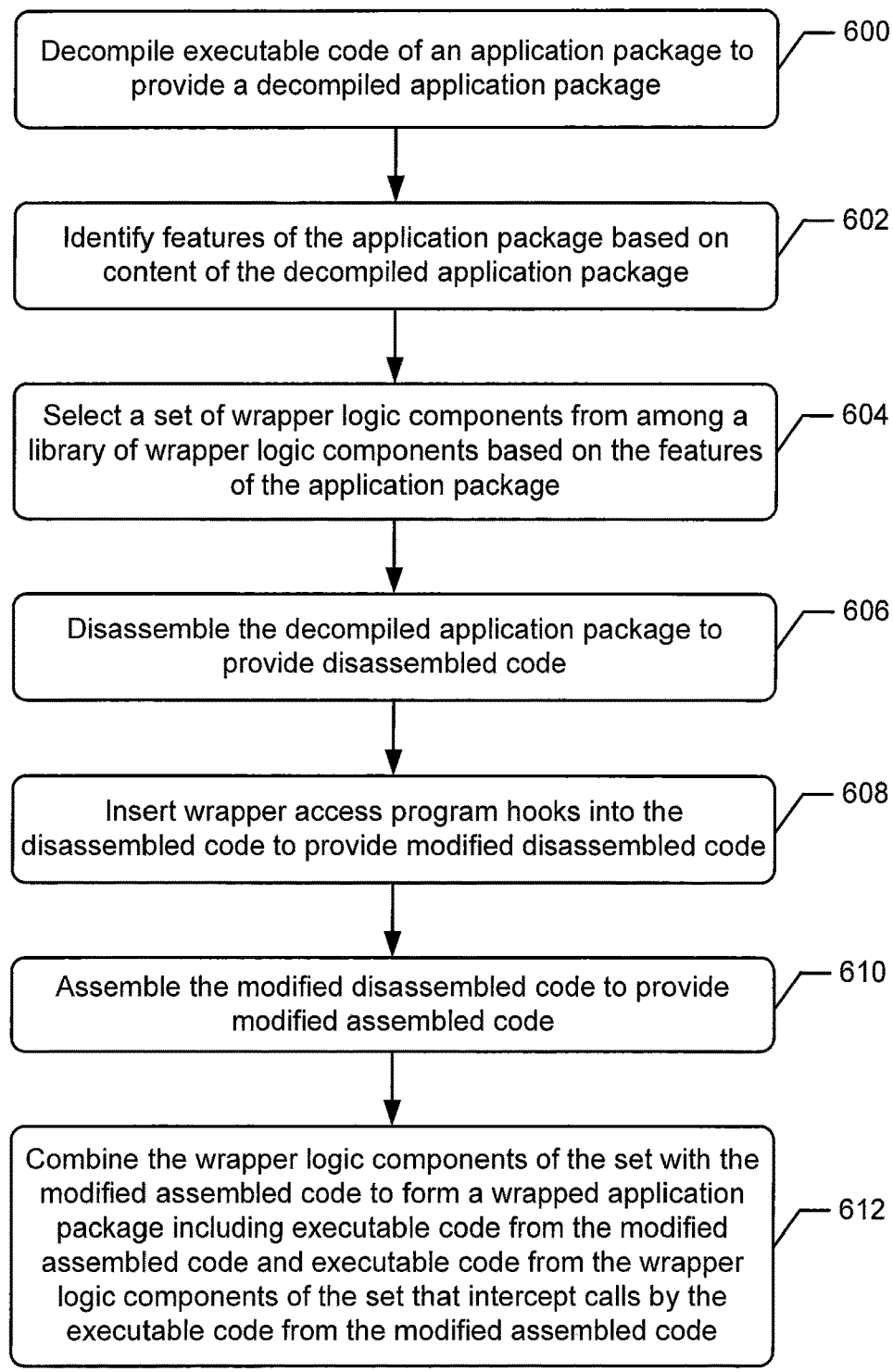
FIGS. 6-10 are flowcharts of operations by an application wrapper computer to generate a wrapped application package according to some embodiments.

FIG. 5 is a block diagram illustrating operations and data flows of an application wrapper computer 500 to generate a wrapped application package 80. FIGS. 6-10 are flowcharts of operations by the application wrapper computer 500 to generate an initial wrapped application package 80 and subsequently generate an updated wrapped application package 80' based on run-time feedback reports according to some embodiments. Referring to FIGS. 5 and 6, executable code of an application package 62 is decompiled (Block 600) using a decompiler 54, such as apktool, to provide a decompiled application package. The decompiled application package may include an XML format manifest, a set of application resources, and classes. The classes file may by a binary source code file, which, for a Java application written for the Android operating system, can be Java classes compiled to Dalvik VM bytecode in .dex format. The decompiled application package is disassembled (Block 606), e.g., by a disassembler 66, to provide disassembled code. For example, binary source code of the application is extracted from the decompiled application package 64, and a disassembler 66 for .dex files, such as smali, disassembles the binary source code to .smali format to produce disassembled code, e.g., disassembled source code. Smali files are an assembly format that is native to dex or Dalvik bytecode.

A wrapper hooks inserter 70 analyzes the disassembled code to determine what modifications need to be made to enable monitoring the wrapper logic components from a software development kit (SDK) library. The wrapper hooks inserter 70 then inserts (Block 608) necessary wrapper program hooks into the disassembled code to provide modified disassembled code, which may be in the .smali format. The wrapper hooks enable respective ones of the wrapper logic components to monitor, e.g., intercept, system calls to respective ones of the application features and/or to monitor, e.g., intercept, API calls from respective ones of the application features to the system, such as described above regarding FIGS. 3 and 4.

The modified disassembled code is then assembled (Block 610) by an assembler 72, such as baksmali, to provide modified assembled code, which may include modified classes in the .dex format. Application resources can be extracted from the decompiled application package by a resource identifier 74. A builder and complier 76 combines the modified assembled code together with application resources and files of an application project 78, such as a software development kit (SDK) library, to form a wrapped application package 80 that can be ready to be installed on a target device, such as an end-user electronic device. For an Android application, the wrapped application package 80 can include an .apk file.

Using the same application project 78 irrespective of functionality of the particular application that is to be built can result in unnecessary increase in the size of the wrapped application package 80, degradation of user experience when the wrapped application package 80 is executed by a device, and/or improper operation (e.g., crashes) of the wrapped application package 80 when executed on the device. Wrapping an application with wrapper logic results in a wrapped application package 80 having increased storage size from the original application package 62. For example, when an application is wrapped using mobile application management, its size may increase at least 25 percent. Moreover, multiple levels of wrapping may be needed to provide various functionalities, with each level of wrapping adding additional storage requirements. Wrapping can degrade the user experience due to, for example, increased usage of the device's processing resources, storage resources, network indication resources, battery power, etc.

The set of wrapper logic components that are used to build an initial wrapped application package 80 are therefore selected using a feature-based modified SDK library of wrapper logic components. In the embodiment of FIG. 5, the application wrapper computer 500 includes an application feature analyzer 530, a wrapper logic component selector 520, and an application project 78 that includes a feature-based modified SDK library.

The application feature analyzer 530 identifies (Block 602) features of the application package 62 based on content of the decompiled application package. A set of wrapper logic components is selected (Block 604) from among a library 510 of wrapper logic components, e.g., a SDK library, based on the features of the application package 62. The wrapper logic components of the set are then combined (Block 612) with the modified assembled code to form the wrapped application package 80 which includes executable code 16 from the modified assembled code and executable code 50 from the wrapper logic components of the set that intercept calls by the executable code 16 (e.g., to the operating system 32) and/or that intercept system event messages (e.g., from the operating system 32) to the executable code 16. The executable code 50 from the wrapper logic components of the set may intercept any number types of calls by the executable code 16 and/or intercept any number types of system event messages to the executable code 16. It is to be understood that the executable code 50 is not necessarily configured to intercept all types of calls by the executable code 16 or intercept all types of system event messages to the executable code 16.

The library 510 can be a SDK library. The wrapper logic component selector 520 may select the set of wrapper logic components from among the SDK library by generating a modified SDK library 540 containing the set of wrapper logic components selected from among the SDK library 510 of wrapper logic components, and excluding from the modified SDK library 540 at least one of the wrapper logic components of the SDK library 510 that is directed to a feature that is not among the features of the application package. The modified SDK library 540 is also referred to as an application feature based modified SDK library or package because it contains wrapper logic components that have been selected from among the wrapper logic components of the SDK library 510 based on the determined features of the application.

The builder and compiler 76 uses the feature based modified SDK library 540 as part of an application project 78 that is combined (Block 612) with the modified assembled code from assembler 72 to form (build) the wrapped application package 80. The builder and compiler 76 may retrieve all of the wrapper logic components of the set from the feature based modified SDK library 540 for combining with the modified assembled code to form the wrapped application package 80. The wrapped application package 80 can contain executable code from the set of application wrapper components 50, compiled from the feature based modified SDK library 540, and executable code compiled from the modified assembled code.

Figure 7:
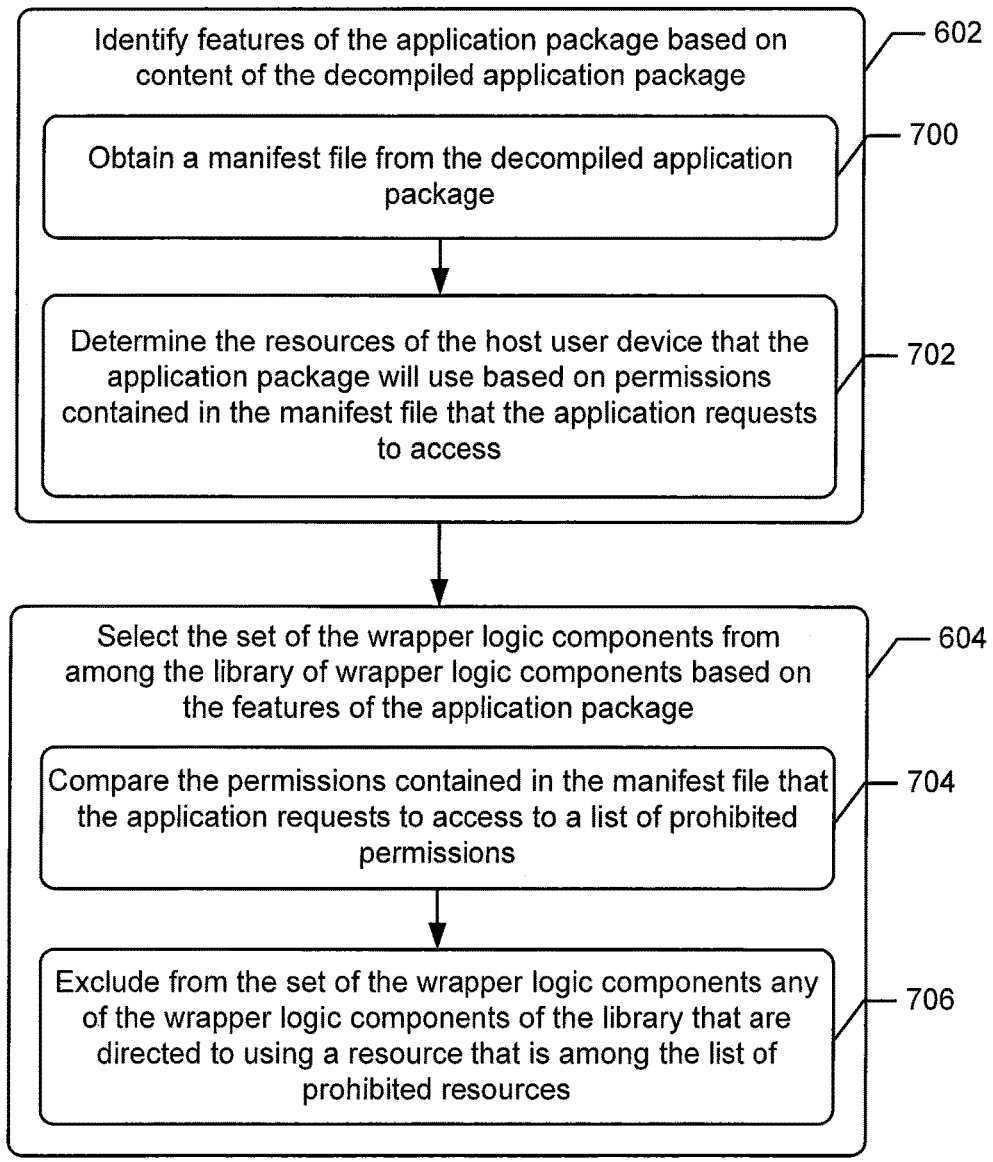

FIG. 7 illustrates operations of the application feature analyzer 530 and the wrapper logic component selector 520 in accordance with some additional or alternative embodiments. Referring to FIG. 7, the application feature analyzer 530 may identify (Block 602) features of the application package 62 by obtaining (Block 700) a manifest file from the decompiled application package (by decompiler 64), and determining (Block 702) the resources of the host user device that the application package will use based on content of the manifest file.

The resources of the host user device that the application package will use may be determined based on permissions contained in the manifest file that the application requests to access. For example, the application feature analyzer 530 may identify associations between labels identified by the permissions to resources that have been defined as being associated with wrapper logic components of the library.

The wrapper logic component selector 520 may select (Block 604) the set of the wrapper logic components from among the library 510 of wrapper logic components based on comparing (Block 704) the permissions contained in the manifest file to a list of prohibited permissions, and excluding (Block 706) from the set of the wrapper logic components any of the wrapper logic components of the library that request to access a permission that is among the list of prohibited permissions. Again, the application feature based SDK library 540 is generated based on the selected set of the wrapper logic components.

Example permissions that may be identified by the application feature analyzer 530 from the manifest file can include one or more of the following:
    uses-permission: android.permission.CAMERA
    uses-permission: android.permission.RECORD_AUDIO uses-permission: android.permission.WRITE_EXTERNAL_STORAGE
uses-permission: android.permission.READ_PHONE_STATE
uses-permission: android.permission.ACCESS_COARSE_LOCATION
uses-permission: android.permission.INTERNET
uses-permission: android.permission.WAKE_LOCK
uses-permission: android.permission.ACCESS_FINE_LOCATION The application feature analyzer 530 may correspondingly determine from the permissions and other information contained in the manifest file that features of the application need to access resources of the host user device that include: a camera, a photo library, a microphone, an external storage device interface (e.g., USB, Lightning, etc.), phone interface and/or contacts, location services, Internet services, encryption, etc.

The wrapper logic component selector 520 can then select wrapper logic components from the SDK library 510 for inclusion in the set of the application feature based modified SDK library 540 based on the list of identified features of the application. The set can therefore include wrapper logic components that are needed to control and/or monitor application calls to the camera, the photo library, the microphone, the external storage device interface, phone interface and/or contacts, location services, Internet, and encryption services. Similarly, the set can include wrapper logic components that are needed to control and/or monitor system events from the camera, the photo library, the microphone, the external storage device interface, phone interface and/or contacts, location services, Internet, and encryption services that are to be communicated to the application. At least some, or in some embodiments all, of the wrapper logic components from the SDK library 510 that are not needed for controlling and/or monitoring such calls and/or system events are excluded from the set of wrapper logic components selected to form the application feature based modified SDK library 540.

The application feature analyzer 530 may identify (Block 602) features of the application package 62 by tracing operational flows through decompiled application code of the decompiled application package, and identify the features of the application package based on comparison of the operational flows to defined rules. For example, the defined rules may identify characteristics of operational flows having defined functionality, which functionality causes the wrapper logic component selector 520 to select certain wrapper logic components from the library 510 for inclusion in the set. By way of example, an operational flow that accesses a data storage structure used to manage stored photos is identified as using a device's photo library functionality.

The application feature analyzer 530 may alternatively or additionally identify (Block 602) features of the application package 62 by identifying characteristics of application interfaces of the decompiled application code of the decompiled application package, and identifying the features of the application package based on the characteristics of the application interfaces of the decompiled application code of the decompiled application package.

For example, the application feature analyzer 530 may determine from a manifest file, from tracing operational flows, and/or identifying application interfaces that an email application, such as Microsoft Outlook, does not use a camera, but will need access to other resources that include: Contacts library, Internet, microphone, speaker, copy & paste functions, file "Open In" function, and an external interface to accessories.

The selector 520 may, for each of the features, count the operational flows that will use the feature, and exclude from the set of the wrapper logic components any of the wrapper logic components of the library 510 that is directed to any of the features that does not have a count that satisfies a rule for a threshold number of the operational flows that will use the feature. Accordingly, rules may be defined which cause the selector 520 to not use an identified feature to select a wrapper logic component of the library 510 for inclusion in the set if the identified feature is not used by at least the threshold number of the operational flows. Features that are used by at least the threshold number of the operational flows can be deemed core features to the operation of the application that should be monitored and/or controlled through wrapper logic components, while features used by less than the threshold number of the operational flows can be deemed non-core features that are not to be monitored and/or controlled through wrapper logic components.

In some further embodiments, the wrapper logic component selector 520 estimates an amount of processor, memory, and/or network communication resource utilization overhead that will be caused to a host device, e.g., end-user device, by operation of a wrapper logic component monitoring a particular one of the features while the application is executed by the host device. The estimate may be based on determination of an execution cycle rate of an operation flow that uses the particular one of the features. The estimate may be further based on a determination of the processor, memory, and/or network communication resource utilization created by each cycle of the wrapper logic component to monitor and/or control an identified number of calls by and/or system events to the operation flow within the identified execution cycle. The wrapper logic component selector 520 then determines whether the wrapper logic component for the particular one of the features is to be included in the set of the modified SDK library 540 based on the estimated amount of processor, memory, and/or network communication resource utilization. For example, a wrapper logic component for a particular one of the features may be excluded from the modified SDK library 540 if the associated estimate of amount of processor utilization exceeds a processor overhead value, if the associated estimate of amount of memory utilization exceeds a memory overhead value, and/or if the associated estimate of amount of network communication exceeds a network communication bandwidth value.

The wrapped application package is distributed to user electronic devices 560, also referred to as "user devices", for execution. The wrapped application package may be distributed through an application server, such as the Google Play Store server for Android applications, the Apple iTunes server for iOS applications, and the Microsoft Windows Store for Windows applications.

In accordance with at least some embodiments disclosed herein, the wrapped application package includes program code that is configured to cause the user electronic devices 560 to generate reports 552 containing content that characterizes performance of the wrapper logic components when executed by the user electronic devices 560 to monitor features of the application during execution of the application by the user electronic devices 560, and to communicate the reports toward the application wrapper computer 500.

Figure 8:
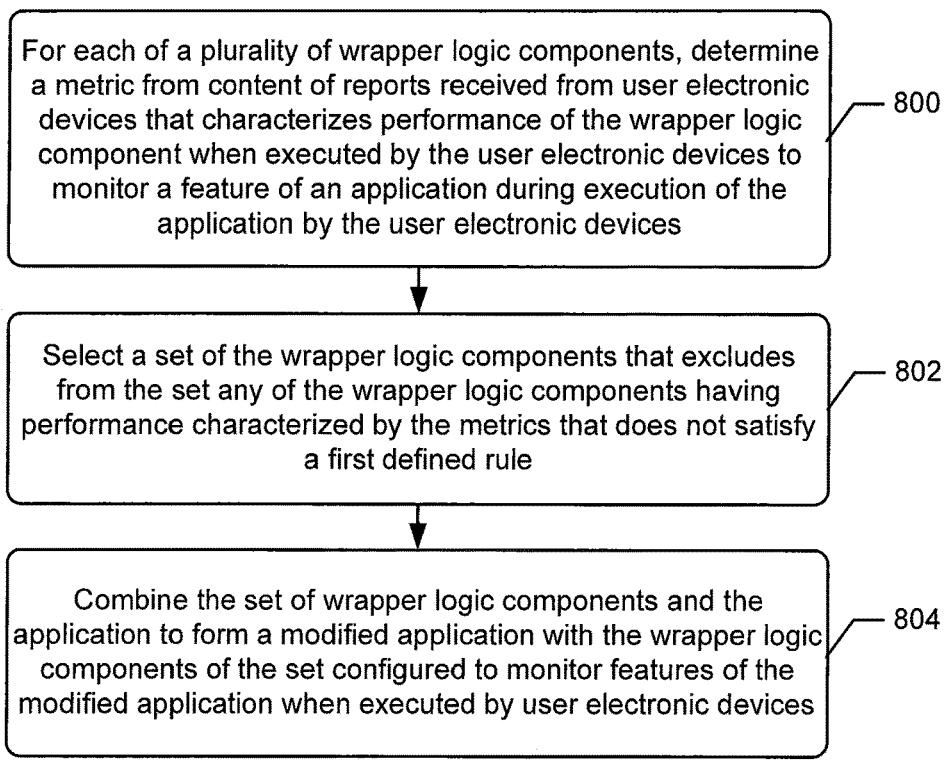

Referring to the flowchart of FIG. 8, the application wrapper computer 500 includes a user device reported metrics analyzer 550 that operates to determine (block 800), for each of a plurality of wrapper logic components, a metric from content of the reports 522 received that characterizes performance of the wrapper logic component when executed by the user electronic devices 560 to monitor a feature of an application during execution of the application by the user electronic devices 560. The metric characterizes the performance (e.g., processor utilization, memory utilization, network bandwidth, execution rate, etc.) by execution of the wrapper logic component itself, as opposed to measuring the performance of the application feature being monitored. Thus, for example, a wrapper logic component that is repetitively executed at a high rate and which consequently consumes significant processor and/or communication bandwidth to perform the monitoring, can have that performance effect characterized by the metric.

The device reported metrics analyzer 550 may wait until a threshold number of reports have been received from another threshold number of different user electronic devices 560 before initiating determination of the metric based on content of the reports. The analyzer may combine (e.g., generate statistics from) content of the reports to generate a metric, and may apply different weighting to content of some reports relative to other reports depending upon characteristics (e.g., hardware and/or software platform characteristics) of the host user electronic devices 560 from which individual ones of the reports were received.

The wrapper logic component selector 520 is further configured to select (block 802) a set of the wrapper logic components that excludes from the set any of the wrapper logic components having performance characterized by the metrics that does not satisfy a first defined rule. The wrapper logic component selector 520 combines (block 804) the set of wrapper logic components and the application to form a modified application (e.g., wrapped application package 80) with the wrapper logic components of the set configured to monitor features of the modified application (executable code 16) when executed by user electronic devices, such as the user devices 560.

For example, if the reports 522 contain information regarding run-time performance of ten different wrapper logic components, the metrics analyzer 550 can generate a separate performance metric for each of the ten different wrapper logic components. The run-time performance of any one of the wrapper logic components may therefore be analyzed independently of the performance of the other wrapper logic components. Consequently, any individual ones of the wrapper logic components having unacceptable performance can be identified and excluded from the subsequent build process for generating another wrapped application package 80 for the application.

In the example of FIG. 5, the wrapper logic component selector 520 can exclude from the set of the wrapper logic components any of the wrapper logic components of the library 510 that corresponds to any of the wrapper logic components having performance characterized by the metrics that does not satisfy a first defined rule. The wrapper logic component selector 520 therefore outputs an application feature and performance based modified SDK library 540, which is used by the builder and compiler 76 to generate an updated wrapped application package 80' (e.g., a new version of the wrapped application) which does not include any wrapper logic components excluded by the selector 520. The updated wrapped application package 80' is distributed to user electronic devices 560 for execution. The updated wrapped application package 80' may be configured similarly to the initial wrapped application package 80 to cause the user electronic devices 560 to generate reports. 552 containing content that characterizes performance of the wrapper logic components when executed by the user electronic devices 560 to monitor features of the application during execution of the application by the user electronic devices 560, and to communicate the reports toward the application wrapper computer 500.

In accordance with some further embodiments, when an application feature is used by several different program modules of the same application, the application wrapper computer 500 selectively controls which of those program modules are monitored by a wrapper logic component based on the performance metric determined for the wrapper logic component. For example, if four different program modules of the application have an application feature which receives system events related to every keyboard key selection by a user, the application wrapper computer 500 may determine based on the performance metric that the wrapper logic component which monitors that feature has a high repetitive rate of execution which exceeds a defined rate threshold and, consequently, triggers the wrapper hooks inserter 70 to insert hooks at locations in the application so that a determined fewer number of those program modules have hooks that trigger monitoring of a system call to those program module by the wrapper logic component. Thus, although the originally generated wrapped application package 80 had hooks inserted to call the same wrapper logic components from four different locations in the application, the updated wrapped application package 80' (e.g., a new version of the application) has hooks inserted to call the same wrapper logic components from a selected fewer number (e.g., 2) of the different locations in the application. The processing overhead caused by the wrapper logic component can therefore be reduced by monitoring, for example, keyboard key selections system events to two of the four program modules instead of monitoring the system events to all four of the program module.

The user device reported metrics analyzer 550 can determine (block 800) the metric for one of the wrapper logic components to selectively characterize many different types of performance that can be determined for how execution of the wrapper logic component affects operation of the application 16, the operating system 32, processors of the electronic devices 560, memory storage capacity of the electronic devices 560, network communication resources of the electronic devices 560, etc.

In one embodiment, the analyzer 550 determines the metric based on measurements, contained in the reports 552, of user electronic device processor utilization by execution of the wrapper logic component by the user electronic devices 560. The selector 520 can then selectively exclude the wrapper logic component from the set depending upon whether the metric satisfies a defined processor utilization threshold. For example, the wrapper logic component may be excluded from the set if it is determined to utilize more processor bandwidth then allowed by the processor utilization threshold. Excluding the wrapper logic component in this manner may avoid excessive interference with responsiveness of the application 16 to system events and/or allow defined processing capacity to remain available for concurrently processing other applications.

In another embodiment, the analyzer 550 determines the metric based on measurements, contained in the reports 552, of user electronic device memory utilization by execution of the wrapper logic component by the user electronic devices 560. The selector 520 can then selectively exclude the wrapper logic component from the set depending upon whether the metric satisfies a defined memory utilization threshold. For example, the wrapper logic component may be excluded from the set if it is determined to utilize more memory storage space (e.g., run-time dynamic RAM and/or flash EEPROM storage memory) then allowed by the memory utilization threshold. Excluding the wrapper logic component in this manner may avoid generating unacceptably large wrapped application packages.

In another embodiment, the analyzer 550 determines the metric based on measurements, contained in the reports 552, of user electronic device communication utilization by execution of the wrapper logic component by the user electronic devices 560. The selector 520 can then selectively exclude the wrapper logic component from the set depending upon whether the metric satisfies a defined communication utilization threshold. For example, the wrapper logic component may be excluded from the set if it is determined to utilize more communication bandwidth then allowed by the communication utilization threshold. Excluding the wrapper logic component in this manner may avoid excessive interference with responsiveness of the application 16 and/or another concurrently executing application due to excessive local bus communications related to execution of the wrapper logic component.

In another embodiment, the analyzer 550 determines the metric based on measurements, contained in the reports 552, of latency added by execution of the wrapper logic component to API calls from operating systems of the user electronic devices 560 to the application. The metric can therefore indicate the difference in latency that occurs between operation of a feature in a wrapped application to operation of the same feature in an unwrapped application. The selector 520 can then selectively exclude the wrapper logic component from the set depending upon whether the metric satisfies a defined latency threshold. For example, the wrapper logic component may be excluded from the set if it is determined to add more than a threshold additional latency to operation of API calls by the application.

In another embodiment, the analyzer 550 determines the metric based on measurements, contained in the reports 552, of latency added by execution of the wrapper logic component to system calls from the application to operating systems of the user electronic devices 560. The selector 520 can then selectively exclude the wrapper logic component from the set depending upon whether the metric satisfies a defined latency threshold.

In another embodiment, the analyzer 550 determines the metric based on measurements, contained in the reports 552, of rate of repetitive execution of the wrapper logic component by the user electronic devices. The selector 520 can then selectively exclude the wrapper logic component from the set depending upon whether the metric satisfies a defined rate threshold. For example, the wrapper logic component may be excluded from the set if it is determined to not be executed with at least a threshold rate during an execution cycle of the application. In one particular example, the wrapper logic component may be excluded if the rate is zero, i.e., the monitored feature is not executed during operation of the application. Alternatively, the wrapper logic component may be excluded if the rate is non-zero but not sufficiently frequent such that the balance of interest of monitoring the infrequently executed feature outweighs the noted undesirable consequences of inserting the wrapper logic component into the wrapped application package. Features that are monitored at least at the threshold rate can be deemed core features of the application that should be monitored and/or controlled through wrapper logic components, while features that are monitored less than the threshold rate can be deemed non-core features that are not to be monitored and/or controlled through wrapper logic components.

In another embodiment, the analyzer 550 determines the metric based on identifying an error with operation of the feature of the application that is caused by the monitoring of the feature by the wrapper logic component. The selector 520 can then exclude the wrapper logic component from the set responsive to identifying the error. For example, when the wrapper logic component is determined to be a likely or probable cause of a run-time error associated with a monitored feature of the application, the selector 520 can exclude the wrapper logic component from the set. The analyzer 550 may furthermore determine the metric based on determining from content of the reports 552 that at least a threshold latency occurred in responsiveness of the feature monitored by the wrapper logic component to a call from the operating systems of the user electronic devices 560. The selector 520 can then exclude the wrapper logic component from the set responsive to determination. Alternatively or additionally, the analyzer 550 may determine from content of the reports that at least a threshold latency occurred in responsiveness of the operating systems of the user electronic devices to calls from the feature monitored by the wrapper logic component.

Figure 9:
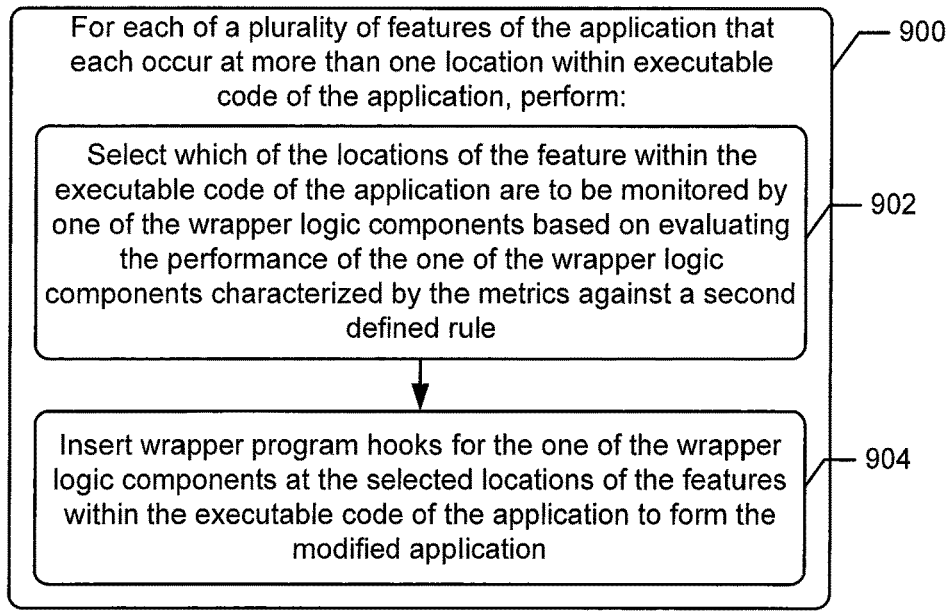

FIG. 9 illustrates a flowchart of operations that may be performed by the application logic component selector 520 and/or by the wrapper hooks inserter 70. Referring to FIG. 9, for each of a plurality of features of the application that each occur at more than one location within executable code of the application, operations are repetitively performed (block 900) to select (block 902) which of the locations of the feature within the executable code of the application are to be monitored by one of the wrapper logic components based on evaluating the performance of the one of the wrapper logic components characterized by the metrics based on a second defined rule. Wrapper program hooks for the one of the wrapper logic components are then inserted (block 904) at the selected locations of the features within the executable code of the application to form the modified application. In this manner, run-time feedback of performance of the wrapper logic components is used to control which locations of repeating features within an application are monitored by the associated wrapper logic components.

In a further embodiments, selection of the selection (block 902) of which of the locations of the feature within the executable code of the application are to be monitored by the one of the wrapper logic components, can include selecting a fewer number of the locations of the feature within the executable code of the application to be monitored by the one of the wrapper logic components based on determining that the performance of the one of the wrapper logic components characterized by the metrics does not satisfy the second defined rule. In sharp contrast, the section (block 902) can include selecting a greater number of the locations of the feature within the executable code of the application to be monitored by the one of the wrapper logic components based on determining that the performance of the one of the wrapper logic components characterized by the metrics does satisfy the second defined rule.

Figure 10:
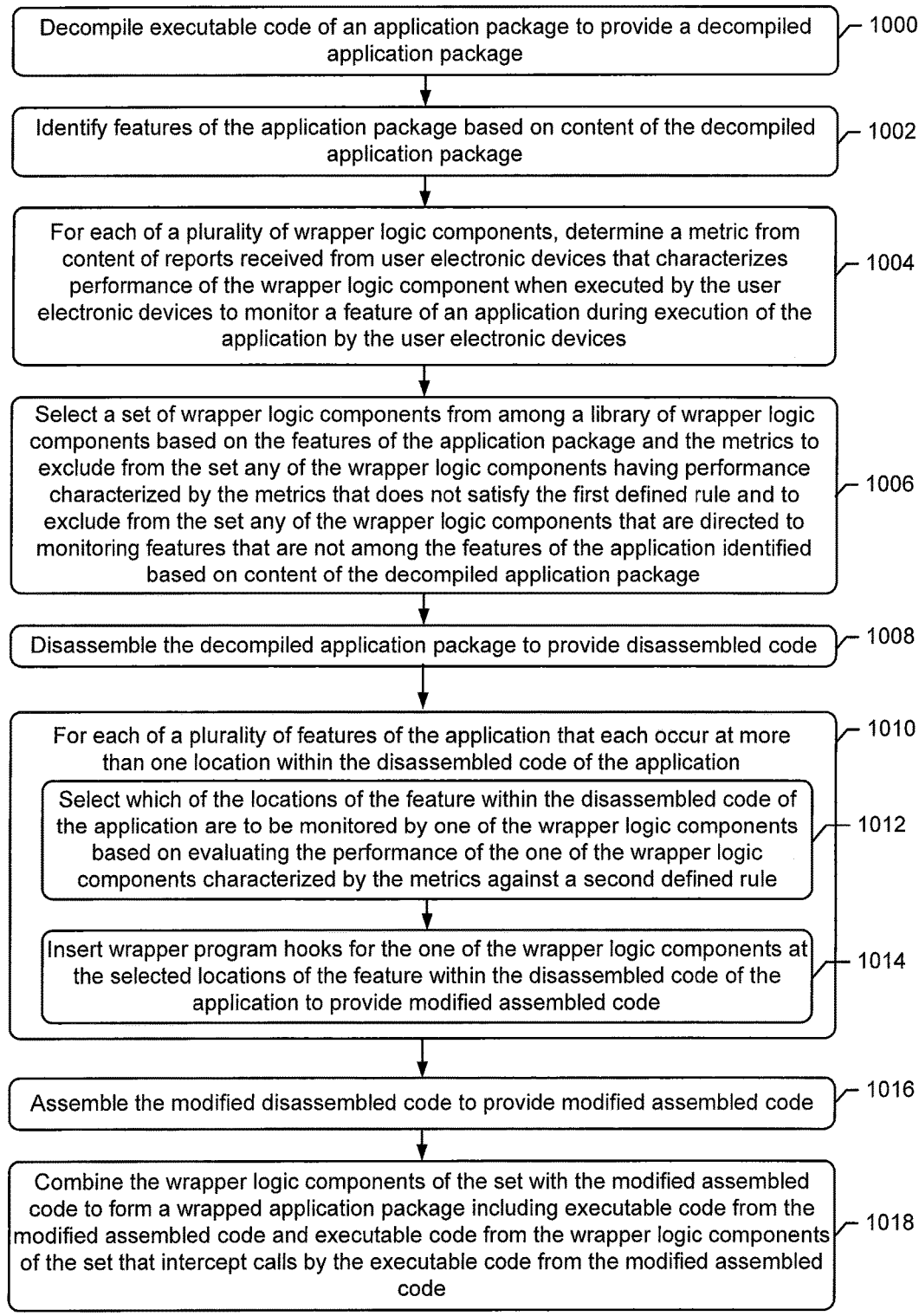

Further example operations are now explained with reference to the flowchart of FIG. 10 and the block diagram of FIG. 5 for how the updated wrapped application package 80' can be generated based on run-time feedback reports characterizing performance of the wrapper logic components while monitoring features, in accordance with some embodiments. Referring to FIGS. 5 and 10, the decompiler 64 decompiles (block 1000) the executable code of the application package 62 to provide a decompiled application package, which may include retrieving the previously decompiled application package from when the wrapped application package 80 was generated. The application feature analyzer 530 identifies (block 1002) features of the application based on content of the decompiled application package. The user device reported metrics analyzer 550 determines (block 1004) for each of the wrapper logic components, a metric from content of reports received from the user electronic devices 560 that characterizes performance of the wrapper logic component when executed by the user electronic devices 560 to monitor a feature of the application during execution of the application by the user electronic devices 560. The wrapper logic component selector 520 selects (block 1006) the set of the wrapper logic components (e.g., from among the SDK library 510 of wrapper logic components) based on the features of the application and the metrics to exclude from the set any of the wrapper logic components having performance characterized by the metrics that does not satisfy the first defined rule and to exclude from the set any of the wrapper logic components that are directed to monitoring features that are not among the features of the application identified based on content of the decompiled application package.

The selector 520 may obtain the manifest file from the decompiled application package, and determine, based on content of the manifest file, resources of the user electronic devices 560 that the wrapper logic components will use when executed by the user electronic devices 560. The selector may then compare the resources of the user electronic devices 560 that the wrapper logic components will use when executed to a list of prohibited resources, and further select the set of the wrapper logic components to exclude from the set any of the wrapper logic components that will use a resource that is among the list of prohibited resources.

The disassembler 66 disassembles (block 1008) the decompiled application package to provide disassembled code. The wrapper hooks inserter 70 inserts wrapper program hooks for the wrapper logic components of the set into the disassembled code to provide modified disassembled code. When inserting wrapper program hooks, the inserter 70 may repeatedly operate (block 1010), for each of a plurality of features of the application that each occur at more than one location within the disassembled code of the application, to select (block 1012) which of the locations of the feature within the disassembled code of the application are to be monitored by one of the wrapper logic components based on evaluating the performance of the one of the wrapper logic components characterized by the metrics based on a second defined rule, and insert (block 1014) wrapper program hooks for the one of the wrapper logic components at the selected locations of the feature within the disassembled code of the application.

The assembler 72 assembles (block 1016) the modified disassembled code to provide modified assembled code. The builder and compiler 76 combines (block 1018) the wrapper logic components of the set with the modified assembled code to form an updated wrapped application package 80' that includes executable code from the modified assembled code and executable code from the wrapper logic components of the set that intercept calls by the executable code from the modified assembled code.

Figure 11:
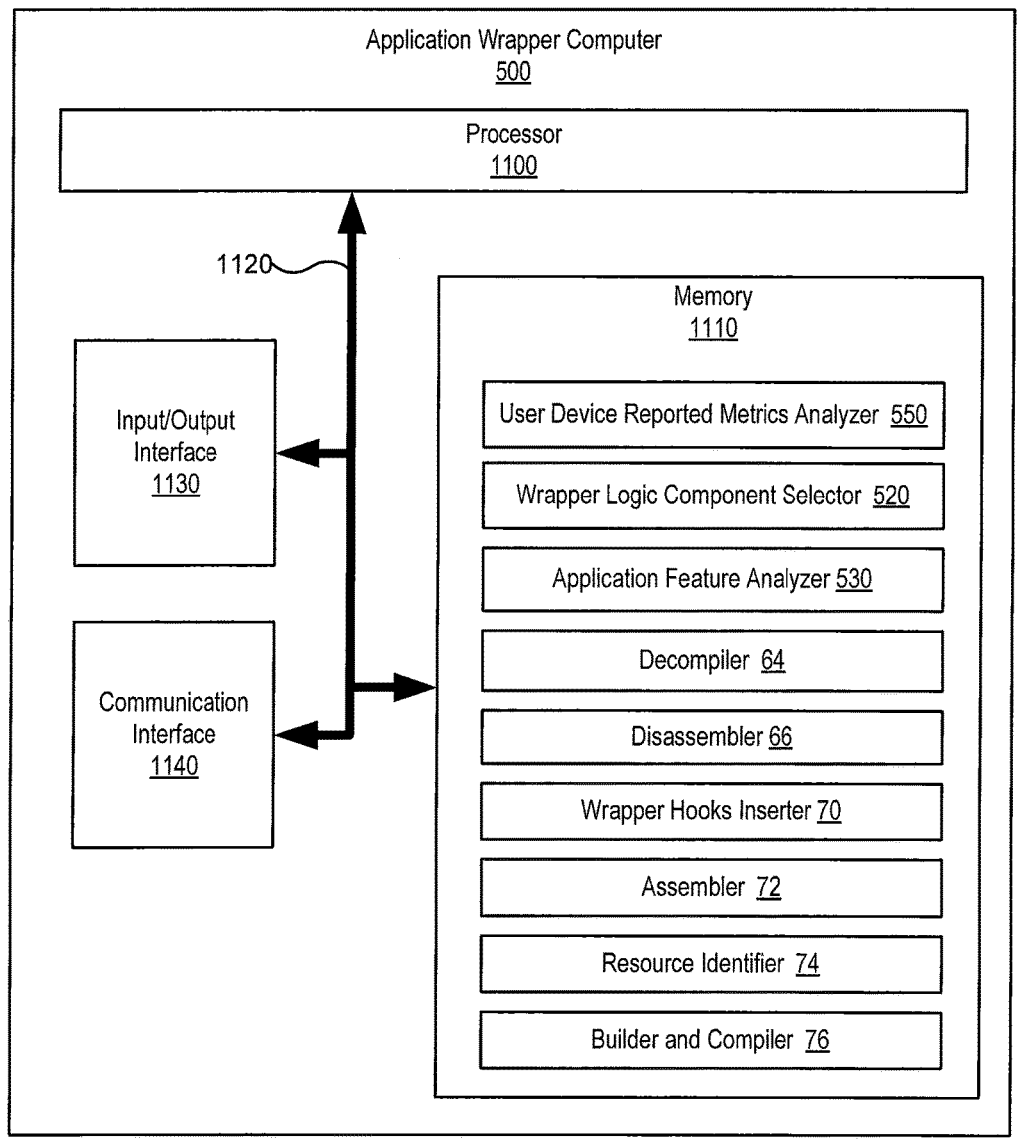
FIG. 11 is a block diagram of an application wrapper computer that generates a wrapped application package according to some embodiments.

FIG. 11 is a block diagram of an application wrapper computer 500 that generates a wrapped application package and a subsequently updated wrapped application package responsive to run-time performance reports from the user devices 560, according to some embodiments. The application wrapper computer 500 is a computing device that includes a processor 1100 that controls operation of the computer 500. The processor 1100 communicates with a memory 1110, an input/output interface 1130 and a communication interface 1140 via a system bus 1120.

The processor 1100 may include one or more data processing circuits, such as a general purpose and/or special purpose processor (e.g., microprocessor and/or digital signal processor) that may be collocated or distributed across one or more networks. The processor 1100 is configured to execute computer program code in the memory 1110, described below as a non-transitory computer readable medium, to perform at least some of the operations described herein as being performed by an electronic device. The program code can include the user device reported metrics analyzer 550, the wrapper logic component selector 520, the application feature analyzer 530, the decompiler 64, the disassembler 66, the wrapper hooks inserter 70, the assembler 72, the resource identifier 74, and the builder and compiler 76.

Although some operations are described herein as being executed by a processor, the operations are not necessarily executed by the same processor. In other words, at least one processor may executed the operations described herein and illustrated by the accompanying drawings.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising, one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAR, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of an application wrapper computer:

for each of a plurality of wrapper logic components that monitor performance of features of an application operated by user electronic devices:
  determining a wrapper logic performance metric identifying an error with operation of a feature of the application operated by the user electronic devices that is caused by operation of the monitoring of the feature during run-time by the wrapper logic component from content of run-time feedback reports received from the user electronic devices, the content identifying performance of the wrapper logic component when executed by the user electronic devices and, wherein the wrapper logic performance metric characterizes the error with operation of the feature of the application caused by the operation of the monitoring the wrapper logic component;
selecting a set of the wrapper logic components that excludes from the set any of the wrapper logic components determined to cause the error with operation of the features of the application characterized by the wrapper logic performance metrics that does not satisfy a first defined rule;
combining the set of wrapper logic components and the application to form a modified application with the wrapper logic components of the set configured to monitor features of the modified application when executed by user electronic devices; and
distributing the modified application to user electronic devices, the modified application excluding any of the wrapper logic components determined to cause the error with operation of the features of the application.

2. The method of claim 1, further comprising:
for each of a plurality of features of the application that each occur at more than one location within executable code of the application, selecting which of the locations of the feature within the executable code of the application are to be monitored by one of the wrapper logic components of the set of the wrapper logic components based on evaluating the performance of the one of the wrapper logic components characterized by the wrapper logic performance metrics based on a second defined rule,
wherein the combining the set of wrapper logic components and the application to form a modified application, comprises:
  inserting wrapper program hooks for the one of the wrapper logic components at the selected locations of the features within the executable code of the application to form the modified application.

3. The method of claim 2, wherein the selecting which of the locations of the feature within the executable code of the application are to be monitored by the one of the wrapper logic components, comprises:
  selecting a fewer number of the locations of the feature within the executable code of the application to be monitored by the one of the wrapper logic components based on determining that the performance of the one of the wrapper logic components characterized by the wrapper logic performance metrics does not satisfy the second defined rule; and
  selecting a greater number of the locations of the feature within the executable code of the application to be monitored by the one of the wrapper logic components based on determining that the performance of the one of the wrapper logic components characterized by the wrapper logic performance metrics does satisfy the second defined rule.

4. The method of claim 1, further comprising:
decompiling executable code of an application package to provide a decompiled application package;
identifying features of the application based on content of the decompiled application package; and
further selecting the set of the wrapper logic components based on the features of the application and the wrapper logic performance metrics to exclude from the set any of the wrapper logic components having performance characterized by the wrapper logic performance metrics that does not satisfy the first defined rule and to exclude from the set any of the wrapper logic components that are directed to monitoring features that are not among the features of the application identified based on content of the decompiled application package.

5. The method of claim 4, wherein the combining the set of wrapper logic components and the application to form the modified application, comprises:
  disassembling the decompiled application package to provide disassembled code;
  inserting wrapper program hooks for the wrapper logic components of the set into the disassembled code to provide modified disassembled code;
  assembling the modified disassembled code to provide modified assembled code; and
  combining the wrapper logic components of the set with the modified assembled code to form a wrapped application package comprising executable code from the modified assembled code and executable code from the wrapper logic components of the set that intercept calls by the executable code from the modified assembled code.

6. The method of claim 5, wherein the inserting wrapper program hooks for the wrapper logic components of the set into the disassembled code to provide modified disassembled code, comprises:
  for each of a plurality of features of the application that each occur at more than one location within the disassembled code of the application, selecting which of the locations of the feature within the disassembled code of the application are to be monitored by one of the wrapper logic components based on evaluating the performance of the one of the wrapper logic components characterized by the wrapper logic performance metrics based on a second defined rule; and
  inserting wrapper program hooks for the one of the wrapper logic components at the selected locations of the feature within the disassembled code of the application.

7. The method of claim 4, further comprising:
obtaining a manifest file from the decompiled application package;
determining based on content of the manifest file, resources of the user electronic devices that the wrapper logic components will use when executed by the user electronic devices;
comparing the resources of the user electronic devices that the wrapper logic components will use when executed to a list of prohibited resources; and
further selecting the set of the wrapper logic components to exclude from the set any of the wrapper logic components that will use a resource that is among the list of prohibited resources.

8. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining the wrapper logic component metric characterizing the error with the operation of the feature of the application caused by the wrapper logic component metric based on measurements, contained in the run-time feedback reports, of user electronic device processor utilization by execution of the wrapper logic component by the user electronic devices.

9. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining the wrapper logic component metric characterizing the error with the operation of the feature of the application caused by the wrapper logic component metric based on measurements, contained in the run-time feedback reports, of user electronic device memory utilization by execution of the wrapper logic component by the user electronic devices.

10. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining the wrapper logic component metric characterizing the error with the operation of the feature of the application caused by the wrapper logic component metric based on measurements, contained in the run-time feedback reports, of user electronic device network communication utilization by execution of the wrapper logic component by the user electronic devices.

11. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining the wrapper logic component metric characterizing the error with the operation of the feature of the application caused by the wrapper logic component metric based on measurements, contained in the run-time feedback reports, of latency added by execution of the wrapper logic component to API calls from operating systems of the user electronic devices to the application.

12. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining the wrapper logic component metric characterizing the error with the operation of the feature of the application caused by the wrapper logic component metric based on measurements, contained in the run-time feedback reports, of latency added by execution of the wrapper logic component to system calls from the application to operating systems of the user electronic devices.

13. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining the wrapper logic component metric characterizing the error with the operation of the feature of the application caused by the wrapper logic component metric based on measurements, contained in the run-time feedback reports, of rate of repetitive execution of the wrapper logic component by the user electronic devices.

14. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining from the content of the run-time feedback reports that at least a threshold latency occurred during a call from the feature to the operating systems of the user electronic devices due to the wrapper logic component monitoring calls from the feature to the operating systems of the user electronic devices.

15. The method of claim 1, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:

determining from the content of the run-time feedback reports that at least a threshold latency occurred during a call to the feature by the operating systems of the user electronic devices due to the wrapper logic component monitoring calls to the feature by the operating systems of the user electronic devices.

16. A computing device, comprising:
a processor; and
a memory coupled to the processor and storing computer readable program code that when executed by the processor causes the processor to perform operations comprising:
for each of a plurality of wrapper logic components that monitor performance of features of an application operated by user electronic devices:
determining a wrapper logic performance metric identifying an error with operation of a feature of the application operated by the user electronic devices that is caused by operation of the monitoring of the feature during run-time by the wrapper logic component from content of run-time feedback reports received from the user electronic devices, the content identifying performance of the wrapper logic component when executed by the user electronic devices and, wherein the wrapper logic performance metric characterizes the error with operation of the feature of the application caused by the operation of the monitoring the wrapper logic component;
selecting a set of the wrapper logic components that excludes from the set any of the wrapper logic components determined to cause the error with operation of the features of the application characterized by the wrapper logic performance metrics that does not satisfy a first defined rule;
combining the set of wrapper logic components and the application to form a modified application with the wrapper logic components of the set configured to monitor features of the modified application when executed by user electronic devices; and
distributing the modified application to user electronic devices, the modified application excluding any of the wrapper logic components determined to cause the error with operation of the features of the application.

17. The computing device of claim 16, wherein the operations further comprise:
for each of a plurality of features of the application that each occur at more than one location within executable code of the application, selecting which of the locations of the feature within the executable code of the application are to be monitored by one of the wrapper logic components of the set of the wrapper logic components based on evaluating the performance of the one of the wrapper logic components characterized by the wrapper logic performance metrics based on a second defined rule,
wherein the combining the set of wrapper logic components and the application to form a modified application, comprises:
inserting wrapper program hooks for the one of the wrapper logic components at the selected locations of the features within the executable code of the application to form the modified application.

18. The computing device of claim 16, wherein the operations further comprise:
decompiling executable code of an application package to provide a decompiled application package;
identifying features of the application based on content of the decompiled application package; and
further selecting the set of the wrapper logic components based on the features of the application and the wrapper logic performance metrics to exclude from the set any of the wrapper logic components having performance characterized by the wrapper logic performance metrics that does not satisfy the first defined rule and to exclude from the set any of the wrapper logic components that are directed to monitoring features that are not among the features of the application identified based on content of the decompiled application package,
wherein the combining the set of wrapper logic components and the application to form the modified application, comprises:
disassembling the decompiled application package to provide disassembled code;
for each of a plurality of features of the application that each occur at more than one location within the disassembled code of the application, selecting which of the locations of the feature within the disassembled code of the application are to be monitored by one of the wrapper logic components based on evaluating the performance of the one of the wrapper logic components characterized by the wrapper logic performance metrics based on a second defined rule;
inserting wrapper program hooks for the one of the wrapper logic components at the selected locations of the feature within the disassembled code of the application to provide modified disassembled code;
assembling the modified disassembled code to provide modified assembled code; and
combining the wrapper logic components of the set with the modified assembled code to form a wrapped application package comprising executable code from the modified assembled code and executable code from the wrapper logic components of the set that intercept calls by the executable code from the modified assembled code.

19. The method of claim 16, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:
determining from the content of the run-time feedback reports that at least a threshold latency occurred during a call from the feature to the operating systems of the user electronic devices due to the wrapper logic component monitoring the call from the feature to the operating systems of the user electronic devices.

20. The method of claim 16, wherein the determining a wrapper logic performance metric identifying an error with operation of a feature of the application operated by the user electronic devices that is caused by operation of the monitoring of the feature during run-time by the wrapper logic component from content of run-time feedback reports that characterizes the error with operation of the feature of the application caused by operation of the wrapper logic component when executed by the user electronic devices, comprises:
determining from the content of the run-time feedback reports that at least a threshold latency occurred during a call to the feature by the operating systems of the user electronic devices due to the wrapper logic component monitoring calls to the feature by the operating systems of the user electronic devices.

* * * * *